US012596083B2

(12) United States Patent
Okada

(10) Patent No.: US 12,596,083 B2
(45) Date of Patent: Apr. 7, 2026

(54) AUTOMATED ANALYZER

(71) Applicant: Shimadzu Corporation, Kyoto (JP)

(72) Inventor: Kohji Okada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 395 days.

(21) Appl. No.: 18/018,293

(22) PCT Filed: May 18, 2021

(86) PCT No.: PCT/JP2021/018795
§ 371 (c)(1),
(2) Date: Jun. 19, 2023

(87) PCT Pub. No.: WO2022/024506
PCT Pub. Date: Feb. 3, 2022

(65) Prior Publication Data
US 2024/0027375 A1      Jan. 25, 2024

(30) Foreign Application Priority Data

Jul. 29, 2020      (JP) ................................. 2020-128042

(51) Int. Cl.
*G01N 23/2204* (2018.01)
*G01N 23/223* (2006.01)
(Continued)

(52) U.S. Cl.
CPC ....... *G01N 23/2204* (2013.01); *G01N 23/223* (2013.01); *G01N 35/00584* (2013.01);
(Continued)

(58) Field of Classification Search
None
See application file for complete search history.

(56) References Cited

U.S. PATENT DOCUMENTS 5,257,302 A * 10/1993 Narukawa ............ G01N 23/223
378/45
5,876,670 A * 3/1999 Mitsumaki ........... G01N 35/026
422/65
(Continued)

FOREIGN PATENT DOCUMENTS

CN       109100523 A      12/2018
JP       S63-236966 A      10/1988
(Continued)

OTHER PUBLICATIONS

English translation of JP 2009-198405 A, cited in the IDS filed Jan. 27, 2023 (Year: 2009).*
(Continued)

*Primary Examiner* — Thomas R Artman
(74) *Attorney, Agent, or Firm* — Muir Patent Law, PLLC

(57) ABSTRACT

An automated analyzer includes: a measurement device; at least one sample tray on which a plurality of sample containers is placed; a conveyance device configured to select one of the plurality of sample containers placed on the sample tray, convey the selected sample container to the measurement device, and return the sample container to an original sample tray on which the sample container was originally placed after measurement by the measurement device; a control device for controlling an operation of the conveyance device; and a retreat portion provided at a position different from positions where the measurement device and the sample tray are provided, the retreat portion being configured to temporarily place the sample container. The control device causes the sample container to retreat to the retreat portion in a case where the sample container cannot be returned from the measurement device to the sample tray.

14 Claims, 5 Drawing Sheets

(51) Int. Cl.
   *G01N 35/00*        (2006.01)
   *G01N 35/04*        (2006.01)
(52) U.S. Cl.
   CPC ......... *G01N 35/0099* (2013.01); *G01N 35/04*
      (2013.01); *G01N 2035/041* (2013.01); *G01N*
      *2035/0462* (2013.01); *G01N 2223/076*
      (2013.01); *G01N 2223/1016* (2013.01); *G01N*
      *2223/306* (2013.01)

(56)                References Cited

U.S. PATENT DOCUMENTS

|  |  |  |  |  |
|---|---|---|---|---|
| 6,438,200 | B1 * | 8/2002 | Kita | G01N 35/00603 |
|  |  |  |  | 378/45 |
| 6,700,951 | B2 * | 3/2004 | Sumii | G01N 23/2204 |
|  |  |  |  | 378/197 |
| 7,842,237 | B1 | 11/2010 | Shibuya et al. | |
| 8,343,772 | B2 * | 1/2013 | Tanaka | G01N 35/026 |
|  |  |  |  | 73/863 |
| 8,701,508 | B2 * | 4/2014 | Hamada | G01N 1/06 |
|  |  |  |  | 73/864.21 |
| 9,134,331 | B2 * | 9/2015 | Hamada | G01N 35/0092 |
| 10,094,844 | B2 * | 10/2018 | Saito | G01N 35/0095 |
| 10,234,364 | B2 * | 3/2019 | Nagai | B01L 9/06 |
| 11,680,951 | B2 * | 6/2023 | Oda | G01N 35/1004 |
|  |  |  |  | 422/63 |
| 2002/0186812 | A1 | 12/2002 | Sumii | |
| 2009/0223311 | A1 * | 9/2009 | Hamada | G01N 1/00 |
|  |  |  |  | 73/863.92 |
| 2009/0227033 | A1 * | 9/2009 | Hamada | G01N 35/0092 |
|  |  |  |  | 422/65 |
| 2012/0148447 | A1 * | 6/2012 | Tanaka | G01N 35/026 |
|  |  |  |  | 422/65 |
| 2014/0170023 | A1 * | 6/2014 | Saito | G01N 35/04 |
|  |  |  |  | 422/65 |
| 2015/0185120 | A1 * | 7/2015 | Nagai | B01L 9/06 |
|  |  |  |  | 422/549 |
| 2020/0072860 | A1 * | 3/2020 | Oda | G01N 35/0095 |
| 2024/0027375 | A1 * | 1/2024 | Okada | G01N 23/223 |
| 2025/0067690 | A1 * | 2/2025 | Suzuki | G01N 23/2204 |

FOREIGN PATENT DOCUMENTS

| JP | H026261 | U |   | 1/1990 |
|---|---|---|---|---|
| JP | H04-102047 | U |   | 9/1992 |
| JP | 2003-057197 | A |   | 2/2003 |
| JP | 2005-207908 | A |   | 8/2005 |
| JP | 2009-198405 | A |   | 9/2009 |
| JP | 2009198406 | A | * | 9/2009 |
| JP | 2010197048 | A |   | 9/2010 |
| JP | 2010-271075 | A |   | 12/2010 |
| JP | 2015096833 | A |   | 5/2015 |
| WO | 2001-051929 | A1 |   | 7/2001 |
| WO | 2020/044399 | A1 |   | 3/2020 |

OTHER PUBLICATIONS

PCT Written Opinion of the International Searching Authority
(Form PCT/ISA/237) for PCT application No. PCT/JP2021/
018795, dated Aug. 10, 2021.
Office Action dated Jan. 9, 2024 for corresponding Japanese patent
application No. JP 2002-540029.
Office Action dated Dec. 10, 2025 for corresponding application No.
CN 202180066220.2.

* cited by examiner

Figure 5:
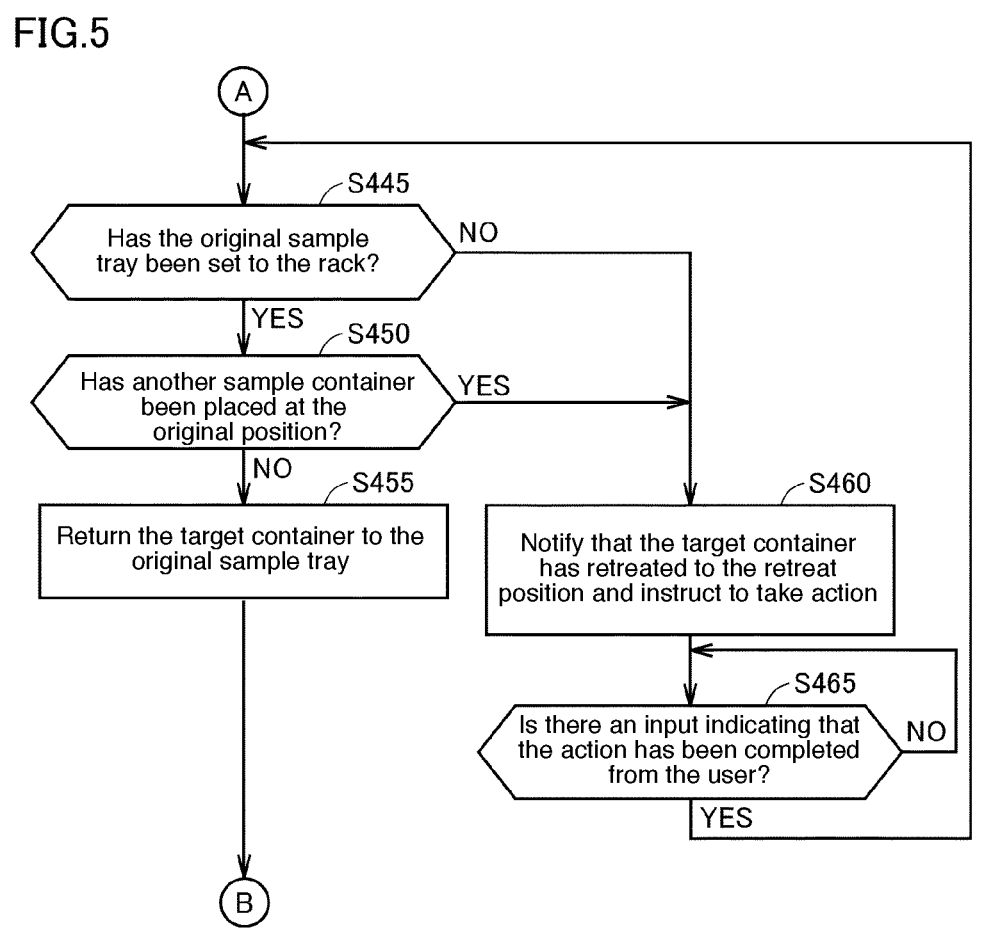

Has the original sample
tray been set to the rack?          NO

YES     S450

Has another sample container
been placed at the
original position?          YES

NO     S455

Return the target container to the
original sample tray

S460

Notify that the target container
has retreated to the retreat
position and instruct to take action

S465

Is there an input indicating that
the action has been completed
from the user?          NO

YES (B)

AUTOMATED ANALYZER

TECHNICAL FIELD

The present disclosure relates to an automated analyzer.

BACKGROUND ART

An automated analyzer for analyzing a sample by measuring the sample is known. One of automated analyzers is an X-ray fluorescence analyzer. The X-ray fluorescence analyzer is configured to analyze constitutional elements of a sample by irradiating the sample with X-rays and measuring the fluorescence X-rays emitted from the sample.

International Publication WO 2020/044399 A1 (Patent Document 1) discloses an X-ray fluorescence analyzer capable of conveying a sample between a sample support (standby position) on which a plurality of samples is placed and a measurement position. The X-ray fluorescence analyzer disclosed in Patent Document 1 moves a sample from the standby position to the measurement position to measure the sample and then returns the sample to the standby position.

PRIOR ART DOCUMENT

Patent Document

Patent Document 1: International Publication WO 2020/044399 A1

SUMMARY OF THE INVENTION

Problems to be Solved by the Invention

In an automated analyzer capable of conveying a sample between a standby position and a measurement position, in some cases, a sample tray set to a rack is provided as a standby position. A plurality of sample containers is placed on the sample tray. The user pulls out the sample tray from the rack and places a sample container on the sample tray, and then sets the sample tray to the rack. At the time of the measurement, one sample container to be measured (hereinafter also referred to as "target container") is selected from a plurality of sample containers placed on the sample tray and is conveyed to a measurement device. After measuring the sample in the target container, the target container is returned to the original sample tray, and the subsequent sample container to be measured is conveyed to a measurement chamber. The sample tray can be pulled out even during the measurement of the sample. For this reason, there occurs a situation in which the sample container has not yet been set to the rack at the timing of returning the sample to the original sample tray after completion of the measurement. Furthermore, there also occurs a situation in which another sample container is placed at the position where the sample container is to be returned (hereinafter also referred to as "original position") at the timing of returning the sample container after completion of the measurement. In a case where the sample tray is not set to the rack, if the sample container is returned, the sample container will drop to be damaged. Further, in a case where another sample container is placed at the original position, if the sample container is returned, the sample container comes into contact with another sample container to be damaged. The present disclosure has been made in view of the above-described circumstances, and an object thereof is to provide an automated analyzer capable of eliminating an adverse effect of a device configured to sequentially measure a plurality of samples.

Means for Solving the Problem

An automated analyzer for analyzing a sample according to the present disclosure, is provided with:

a measurement device configured to measure the sample;

at least one sample tray provided outside the measurement device, the at least one sample tray being configured to place a plurality of sample containers thereon;

a conveyance device configured to select one of the plurality of sample containers placed on the sample tray, convey the selected sample container to the measurement device, and return the sample container to an original sample tray on which the sample container was originally placed after measurement by the measurement device;

a control device configured to control an operation of the conveyance device; and a retreat portion provided at a position different from positions where the measurement device and the sample tray are provided, the retreat portion being configured to temporarily place the sample container.

The control device causes the sample container to retreat to the retreat portion n a case where the sample container is unable to be returned from the measurement device to the original sample tray.

Effects of the Invention

According to the present disclosure, in a case where the sample container cannot be returned from the measurement device to the original sample tray, the sample container after the measurement is retreated to the retreat portion. With this configuration, it is possible to prevent the sample container from being damaged due to falling or touching, and therefore, it is possible to eliminate an adverse effect of the device configured to sequentially measure a plurality of samples.

BRIEF DESCRIPTION OF THE DRAWINGS

FIG. 5 is a flowchart showing the conveyance processing of a sample container according to Embodiment 1.

EMBODIMENTS FOR CARRYING OUT THE INVENTION

Figure 1:
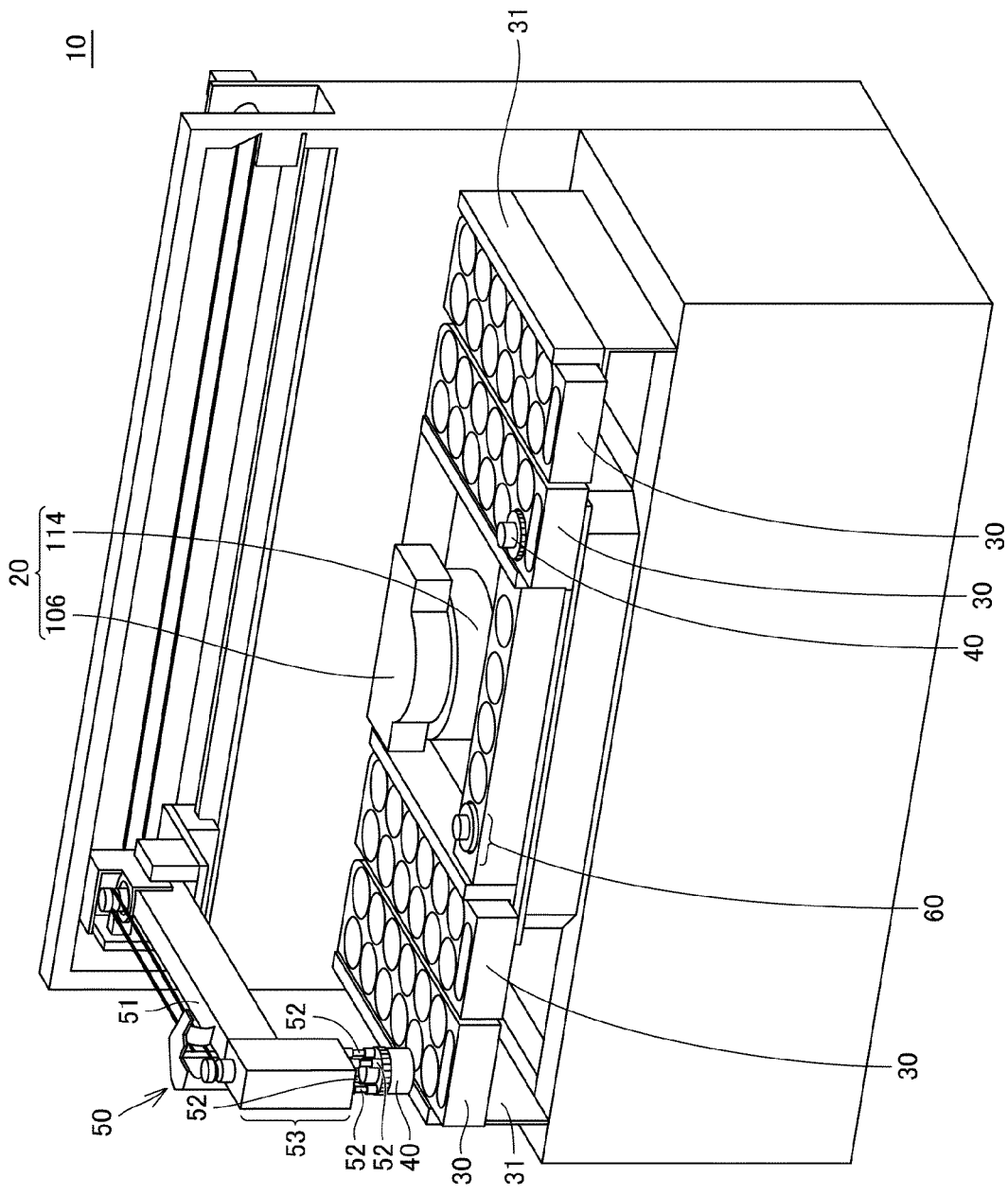
FIG. 1 is a diagram showing an inside of an X-ray fluorescence analyzer according to Embodiment 1.

Hereinafter, some embodiments will be described with reference to the attached drawings. The same or corresponding portion in the drawings is assigned by the same reference symbol, and the description thereof will not be repeated. Hereinafter, an X-ray fluorescence analyzer will be exemplified as an automated analyzer.

Embodiment 1

<Overall Configuration of X-ray Fluorescence Analyzer>

Figures 2, 3:
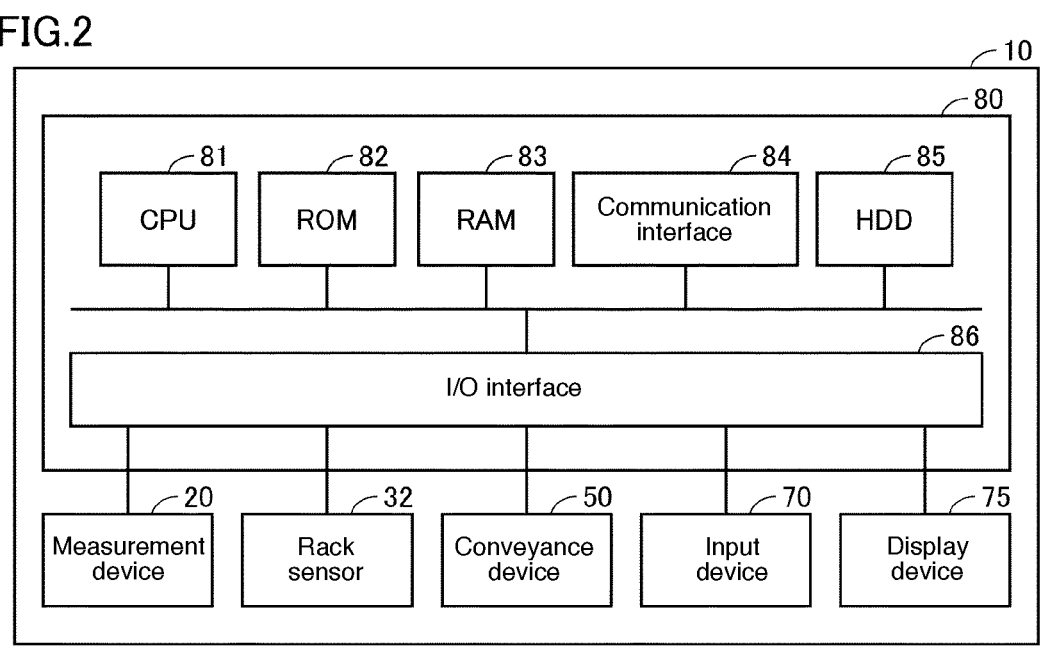
FIG. 2 is a diagram showing the control configuration of the X-ray fluorescence analyzer according to Embodiment 1.
FIG. 3 is a diagram showing the configuration example of a measurement device according to Embodiment 1.

Referring to FIG. 1 and FIG. 2, the entire configuration of an X-ray fluorescence analyzer according to Embodiment 1 will be described. FIG. 1 is a diagram showing the inside of the X-ray fluorescence analyzer 10 according to Embodiment 1. FIG. 2 is a diagram showing the control configuration of the X-ray fluorescence analyzer 10 according to Embodiment 1. The X-ray fluorescence analyzer 10 is configured to analyze constituent elements of a sample by irradiating the sample with X-rays and measuring the fluorescence X-rays emitted from the sample. The X-ray fluorescence analyzer 10 is provided with a measurement device 20, a sample tray 30, a rack 31, a rack sensor 32, a conveyance device 50, a retreat portion 60, an input device 70, a display device 75, and a control device 80.

The measurement device 20 is an energy-dispersive X-ray fluorescence analyzer (Energy Dispersive X-ray Fluorescence Spectrometer: EDX) for measuring concentrations of elements contained in a sample. The measurement device 20 irradiates the sample with X-rays and measures concentrations of the elements contained in the sample according to an instruction from the control device 80. The measurement device 20 is configured by a sample chamber 106 and a measurement chamber 114. The measurement device 20 is covered with a housing and an opening/closing lid and forms a sealed space therein.

The sample tray 30 is a tray that can be insertable and removable by the user and is provided outside the measurement device 20. The sample tray 30 can be insertable and removable even during the measurement of a sample. One or more sample trays 30 are provided in the X-ray fluorescence analyzer 10. In this embodiment, four sample trays 30 are provided in the X-ray fluorescence analyzer 10. A plurality of sample containers 40 is placed on each of the sample trays 30. In this embodiment, up to twelve sample containers can be placed on each sample tray 30.

The sample container 40 is a container for accommodating a sample, and is, for example, a milky-white container in which a transparent film is provided on the analyzing surface to be irradiated with X-rays. The upper portion of the sample container 40 is opened, and the interior of the sample container 40 is an unsealed space. The sample container 40 can accommodate a wide variety of samples and can accommodate a powder sample and a liquid sample, other than a solid sample.

The sample tray 30 is set to the rack 31 provided outside the measurement device 20. In the case of placing the sample container 40 on the sample tray 30, the user pulls out the sample tray 30 from the rack 31, places the sample container 40 on the sample tray 30, and then inserts the sample tray 30 into the rack 31. The rack 31 is provided with a rack sensor 32 (corresponding to "first sensor"). The rack sensor 32 detects that the sample tray 30 is set to the rack 31. In order to be able to detect the position where the sample tray 30 is set to the rack 31, the rack sensor 32 is provided for each position where the sample tray 30 is set. The rack sensor 32 transmits a detection result to the control device 80. Specifically, in a case where the sample tray 30 is set to the rack 31, the rack sensor 32 transmits the fact that the sample tray 30 is set to the rack 31 and the identifier of the sample tray 30 set to the rack 31 to the control device 80. In a case where the sample tray 30 is not set to the rack 31, the rack sensor 32 transmits the fact that the sample tray 30 is not set to the rack 31 to the control device 80. Accordingly, the control device 80 can identify the sample tray 30 set in the rack 31. In a case where it is not required to identify the sample tray 30 set to the rack 31, the rack sensor 32 transmits only the fact whether the sample tray 30 is set to the rack 31 to the control device 80. Further, it may be configured such that the rack sensor 32 does not detect whether the sample tray 30 is set at each position where the sample tray 30 is set, but detect whether the sample trays 30 are set to all racks 31.

In accordance with an instruction from the control device 80, the conveyance device 50 selects one sample container 40 (hereinafter also referred to as "target container") out of a plurality of sample containers 40 placed on the sample tray 30 and conveys the selected one to the measurement device 20. The conveyance device 50 includes an arm 51, four claws 52 (corresponding to the "gripping portion"), and a driving source (motor, etc.) of the arm 51. The arm 51 is driven by a drive source in the X-axis direction, the Y-axis direction, and the Z-axis direction. The X-axis direction denotes any one arbitral direction in the horizontal direction, and the Y-axis direction denotes a direction perpendicular to the X-axis direction. The Z-axis direction denotes a direction perpendicular to the X-axis direction and the Y-axis direction, and is a vertical direction. The claws 52 are provided at the tip end portion 53 of the arm 51 to grip the sample container 40. The claws 52 are expanded outward upon contact with the sample container 40. The claws 52 grips the sample container 40 when expanded outward. The conveyance device 50 grips one target container with the claws 52 and conveys the target container from the sample tray 30 to the measurement device 20. When the measurement of the sample in the target container is completed, the conveyance device 50 conveys the target container from the measurement device 20 to the original sample tray 30 or the retreat portion 60. Specifically, in a case where the target container can be returned to the original position of the original sample tray 30, the conveyance device 50 returns the target container to the original position of the original sample tray 30. On the other hand, in a case where the target container cannot be returned to the original position of the original sample tray 30, the conveyance device 50 conveys the target container to the retreat portion 60. Note that in this embodiment, four claws 52 are provided, but the number of claws 52 is not limited to four as long as the craws can grip the sample container 40.

The sample container 40 is temporarily placed at the retreat portion 60. The retreat portion 60 is provided at a position different from positions where the measurement device 20 and the sample tray 30 are provided. The retreat portion 60 is not configured to be covered with a housing and an opening/closing lid like the measurement device 20 and does not form a sealed space. In a case where after the measurement of the sample of the target container, the target container cannot be returned from the measurement device 20 to the original sample tray 30, the retreat portion 60 is used as a temporary location for the sample container 40. There are two cases where the target container cannot be returned from the measurement device 20 to the original sample tray 30. One is a case where the original sample tray 30 on which the target container was originally placed is not set to the rack 31. The other is a case where the original sample tray 30 is set to the rack 31, but another sample container is placed at the original position where the target container was originally placed. Whether the original sample tray 30 is set to the rack 31 is determined based on the detection result by the rack sensor 32. Whether another sample container is placed at the original position is determined based on the state of the claws 52 (for example, the opening degree of the claws 52) caused by the operation by causing the conveyance device 50 to grip the sample container 40 at the original position. Note that in this embodiment, although only one sample container 40 can be placed at the retreat portion 60, but it may be configured such that a plurality of sample containers 40 can be placed.

The input device 70 receives an input including an instruction from the user to the control device 80. The input device 70 is, for example, a keyboard, a mouse, a touch panel integrally formed with the display screen of the display device 75 described later. The input device 70 transmits the received input to the control device 80. For example, when an input of an analysis parameter is accepted, the input device 70 transmits the analysis parameter to the control device 80. When accepted an input indicating that the action has been completed from the user, the input device 70 notifies the control device 80 that the action has been completed.

The display device 75 displays various screens. The display device 75 displays, for example, a screen for inputting a measurement condition (analysis parameter), a screen for notifying that the sample container 40 has retreated to the retreat portion, a screen for instructing the user to take action, or the like.

The control device 80 includes a CPU (Central Processing Unit) 81, a ROM (Read Only Memory) 82, a RAM (Random Access Memory)83, a communication interface 84, an HDD (Hard Disk Drive) 85, and an I/O (Input/Output) interface 86.

The CPU 81 comprehensively controls the entire X-ray fluorescence analyzer 10. The CPU 81 expands the program stored in the ROM 82 on a RAM 83 and executes the program. The ROM 82 stores a program in which processing procedure of the control device 80 is written. The RAM 83 serves as a task region when the CPU 81 executes a program and temporarily stores a program, data or the like when the program is executed. The communication interface 84 is an interface for communicating with an external device. The HDD 85 is a non-volatile storage device to store the measurement result by the X-ray fluorescence analyzer 10. The I/O interface 86 is an interface for an input to the control device 80 or an output from the control device 80. The I/O interface 86 is connected to the measurement device 20, the rack sensor 32, the conveyance device 50, the input device 70, and the display device 75.

In the case of conveying the sample container 40, the control device 80 performs the following control. First, the control device 80 moves the arm 51 so that the tip end portion 53 of the arm 51 is positioned above the sample container 40 as a conveyance target. When the tip end portion 52 of the arm 51 has reached above the sample container 40 as a conveyance target, the control device 80 lowers the arm 51 and causes the claws 52 to grip the sample container 40. Then, the control device 80 raises the arm 51 to a predetermined position. When the arm 51 is raised to the predetermined position, the control device 80 moves the arm 51 such that the tip end portion 53 of the arm 51 is positioned above the transfer destination of the sample container 40. When the tip end portion 53 of the arm 51 has reached above the transfer destination of the sample container 40, the control device 80 lowers the arm 51. When the bottom surface of the sample container 40 has reached the transfer destination, the control device 80 causes the claws 52 to release the sample container 40.

<Configuration of Measurement Device 20>

With reference to FIG. 2 and FIG. 3, the detailed configuration of the measurement device 20 and the measurement of the sample by the measurement device 20 will be described. FIG. 3 is a diagram showing the configuration example of the measurement device 20 according to Embodiment 1. The measurement device 20 includes housings 102 and 112 and a sample stage 104. The housing 102 is provided on the upper surface of the sample stage 104, and a sample chamber 106 is formed by the housing 102 and the sample stage 104. The housing 112 is provided on the lower surface of the sample stage 104, and a measurement chamber 114 is formed by the housing 112 and the sample stage 104. The space formed by the sample chamber 106 and the measurement chamber 114 is hermetically enclosed by the housings 102 and 112, and the sample chamber 106 and the measurement chamber 114 communicate with each other by a connecting passage 110 provided in the sample stage 104.

The sample stage 104 is provided with an opening 108, and a sample container 40 is placed on the sample stage 104 so as to cover the opening 108. At the time of measurement, the sample container 40 is placed on the sample stage 104 such that the measurement position of the sample in the sample container 40 is exposed at the opening 108 to the measurement chamber 114. Above the opening 108 on which the sample container 40 is placed, an opening 22 is formed in the housing 102, and an opening/closing lid 24 is provided in the opening 22. At the time of loading the sample container 40 into the sample chamber 106 and unloading from the sample chamber 106, the opening/closing lid 24 becomes in a opened state, and at the time of measurement, the opening/closing lid 24 becomes in a closed state. The opening/closing lid 24 is configured to maintain the airtightness within the sample chamber 106 and the measurement chamber 114 in the closed state.

The measurement chamber 114 is provided with an X-ray tube 116 and a detector 126 provided on the housing 112. The X-ray tube 116 emits primary X-rays toward the lower surface (analysis plane) of the sample container 40. The X-ray tube 116 includes a filament and a target and generates X-rays from the target by accelerating thermal electrons generated from the filament at a high voltage to collide against the target. The primary X-rays emitted by the X-ray tube 116 are emitted to the measurement position of the sample in the sample container 40 through the opening 108.

When the sample in the sample container 40 is irradiated with X-rays from the X-ray tube 116, fluorescence X-rays are generated from the sample by the photoelectric effect. Since fluorescent X-rays have energy peculiar to each element, the qualitative analysis of the elements contained in the sample can be performed by detecting the energy of the fluorescent X-rays by the detector 126, and the quantitative analysis of the elements contained in the sample can be performed by measuring the intensity of the fluorescent X-rays. Further, the detector 126 is constituted by, for example, a semiconductor detection device including a Si (Li) element.

The measurement chamber 114 is provided with a shutter 118, a primary X-ray filter 120, and a collimator 122 therein. The shutter 118, the primary X-ray filter 120, and the collimator 122 are configured to be slidable by the drive mechanism 124 in a direction perpendicular to the optical path of the primary X-rays.

The shutter 118 is made of an X-ray absorbing material, such as, e.g., lead, and can be inserted into the optical path of the primary X-rays when required to shield the primary X-rays. The primary X-ray filter 120 is formed by a metal foil selected according to the object and attenuates the background components of the primary X-rays emitted from the X-ray tube 116 to improve the S/N ratio of the required characteristic X-rays. Note that, in the actual device, a plurality of primary X-ray filters 120 formed of different types of metals is used, and the primary X-ray filter 120 selected according to the purpose is inserted into the optical path of the primary X-ray by the drive mechanism 124.

The collimator 122 is an aperture having a circular opening in the center to determine the size of the primary X-ray beam emitted to the sample. The collimator 122 is made of an X-ray absorbing material, such as, e.g., lead and brass. In the actual device, a plurality of collimators 122 having different aperture diameters is arranged in a direction perpendicular to the optical path of the primary X-rays, and thes collimator 122 selected according to the purpose is inserted into the optical path of the primary X-rays by the drive mechanism 124.

The exhaust device 130 is a device for exhausting the atmosphere in the sample chamber 106 and the measurement chamber 114 and includes, for example, an exhaust pump, an on-off valve, a pressure control valve, a pressure gauge, and the like. The exhaust device 130 is controlled by the control device 80 in accordance with the analytical parameter and can make the chamber in a vacuum atmosphere (e.g., 30 Pa or less) by discharging the air in the chamber via the vent 128 and the switching valve 134.

The air charging device 132 is a device for supplying an atmospheric air or a helium gas into the sample chamber 106 and the measurement chamber 114 and includes, for example, an air supply pump, an on-off valve, a pressure gauge, or the like. The air charging device 132 is controlled by the control device 80 according to the analytical parameter. In a case where the chamber is in a vacuum atmosphere when the atmosphere is set, the air charging device 132 supplies the atmosphere into the chamber via the switching valve 134 and the vent 128. When the helium atmosphere is set, the air charging device 132 supplies a helium atmosphere into the chamber via the switching valve 134 and the vent 128.

The switching valve 134 is controlled by the control device 80. At the time of discharging by the exhaust device 130, the switching valve 134 connects the exhaust device 130 to the vent 128 and blocks the entry of gases from the air charging device 132. At the time of supplying air by the air charging device 132, the switching valve 134 connects the air charging device 132 to the vent 128 and shuts off the discharge of gases to the exhaust device 130.

Note that in this example, the ventilation hole 128 is provided around the detector 126, but the configuration of the ventilation hole 128 is not limited thereto.

When measuring the sample, the control device 80 performs the following control. First, the control device 80 controls the atmosphere in the measurement chamber of the measurement device 20 in accordance with the analytical parameter of the target container. The analytical parameter is set by the user using the input device 70 for each sample container 40 placed on the sample tray 30 (see FIG. 1). Specifically, the control device 80 controls the state of the atmosphere in the measurement chamber 114 to any one of the atmospheric atmosphere, the vacuum atmosphere, and the helium atmosphere according to the analytical parameter.

Once the atmosphere in the measurement chamber 114 is adjusted, the control device 80 starts measuring with the measurement device 20 according to the analytical parameter of the target container. Specifically, the control device 80 controls the tube voltage, the tube current, and the illumination duration of the X-ray tube 116 and drives the shutter 118, the primary X-ray filter 120, and the collimator 122 according to the analytical parameter.

Then, the control device 80 performs an analysis (qualitative analysis, quantitative analysis) of various elements included in the sample in the target container, based on the spectrum of the secondary X-rays (fluorescence X-rays) detected by the detector 126, and stores the analysis results in the HDD 85.

<Conveyance of Sample Container 40>

Figure 4:
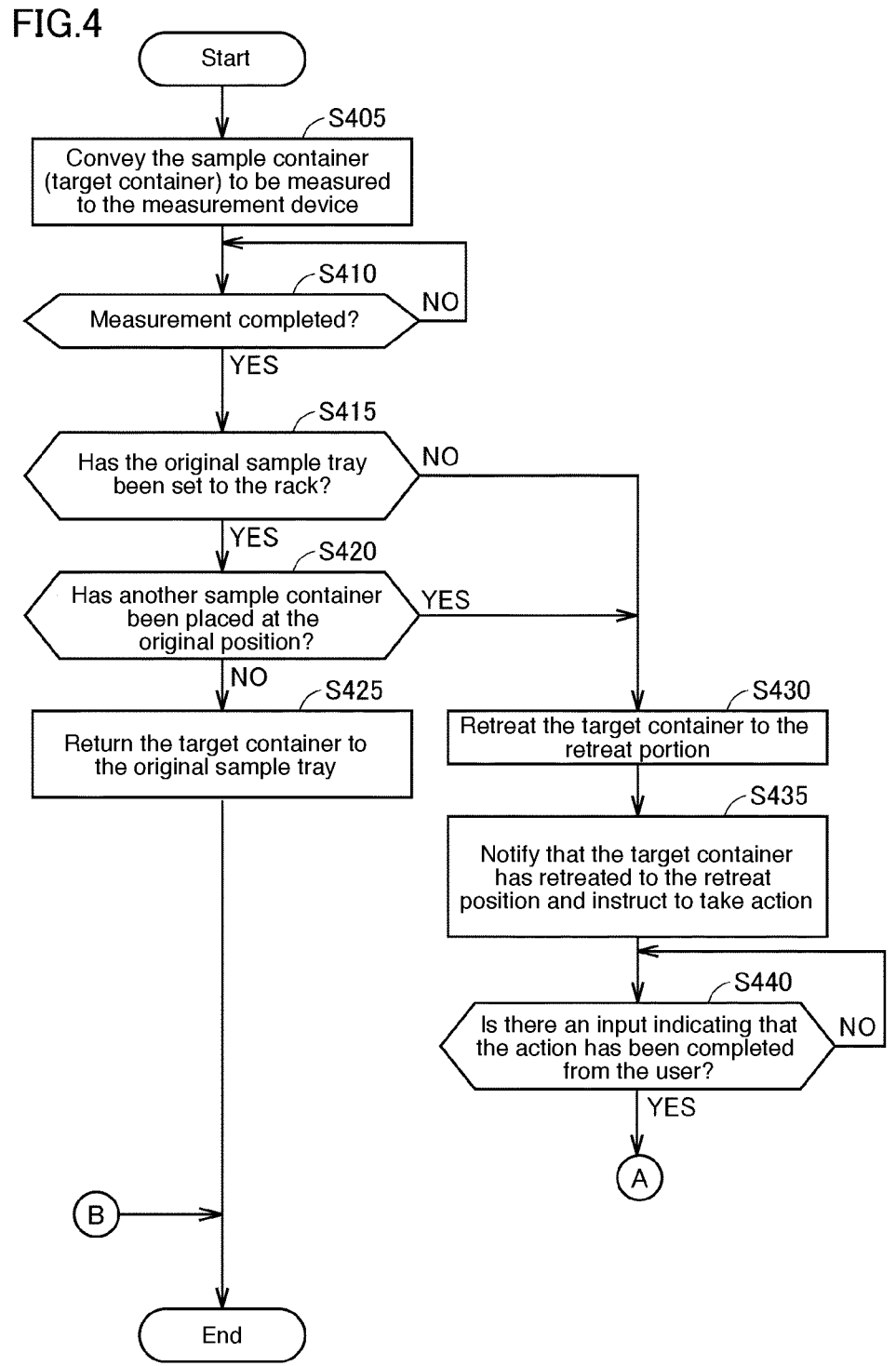
FIG. 4 is a flowchart showing the conveyance processing of a sample container according to Embodiment 1.

With reference to FIG. 1, FIG. 2, FIG. 4, and FIG. 5, the conveyance of the sample container 40 will be described. FIG. 4 and FIG. 5 are flowcharts showing the conveyance processing of the sample container 40 according to Embodiment 1. The processing shown in FIG. 4 and FIG. 5 is processing performed by the control device 80 and is realized by the CPU 81 executing a program stored in the ROM 82.

First, the control device 80 conveys the sample container 40 (target container) to be measured to the measurement device 20 (Step S405). Specifically, the control device 80 selects one sample container 40 (target container) to be measured out of the plurality of sample containers 40 placed on the sample tray 30, and conveys the target container to the measurement device 20 by controlling the conveyance device 50.

Then, the control device 80 determines whether the measurement by the measurement device 20 has been completed (Step S410). When the measurement by the measurement device 20 has been completed (YES in Step S410), the control device 80 causes the processing to shift to Step S415. The completion of the measurement by the measurement device 20 includes not only when all measurements by the measurement device 20 have been completed, but also when some measurements by the measurement device 20 have been completed. The case in which some measurements by the measurement device 20 have been completed denotes the case of terminating an ongoing measurement when another sample is urgently required to be measured in the middle of measuring a specific sample.

In Step S415, the control device 80 determines whether the original sample tray 30 has been set to the rack 31. The original sample tray 30 denotes the sample tray 30 on which the sample container 40 which is being measured was originally placed. The control device 80 determines whether the original sample tray 30 has been set to the rack 31, based on the information transmitted from the rack sensor 32. In a case where the original sample tray 30 has been set to the rack 31 (YES in Step S415), the control device 80 causes the processing to proceed to Step S420. On the other hand, in a case where the original sample tray 30 has not been set to the rack 31 (NO in Step S415), the control device 80 determines that the target container cannot be returned from the measurement device 20 to the original sample tray 30, and causes the processing to proceed to Step S430.

It should be noted that, in the case of not detecting whether the sample tray 30 has been set to the racks 31 at each position where the sample tray 30 is set to, but in the case of detecting whether the sample trays 30 has been set to all racks 31, in Step S415, the control device 80 determines whether sample trays 30 are set to all racks 31. In such a case, in a case where at least one sample tray 30 has not been set to the rack 31, the control device 80 determines that the target container cannot be returned from the measurement device 20 to the original sample tray 30 and causes the processing to proceed to Step S430.

In Step S420, the control device 80 determines whether another sample container has been placed on the original position. The original position denotes a position on the sample tray 30 where the target container was originally placed and a position where the container 40 is returned after the measurement. The control device 80 causes the conveyance device 50 to perform an operation of gripping the sample container 40 at the original position and determines whether another sample container has been placed at the original position, based on the spread of the claws 52 caused by the operation. When another sample container exists at the original position, the claws 52 are spread outward due to the contact with the sample container. The control device 80 determines that another sample container has been placed at the original position when the claws 52 are spread and determines that another sample container has not been placed at the original position when the claws 52 are not spread. In a case where another sample container has been placed at the original position (YES in Step S420), the control device 80 determines that the target container cannot be returned from the measurement device 20 to the original sample tray 30 and causes the processing to proceed to Step S430. On the other hand, in a case where another sample container has not been placed at the original position (NO in Step S420), the control device 80 causes the processing to proceed to Step S425.

In Step S425, the control device 80 causes the target container to return from the measurement device 20 to the original position of the original sample tray 30 and terminates the series of processing shown in FIG. 4 and FIG. 5.

In Step S430, the control device 80 causes the target container to retreat to the retreat portion 60. Next, the control device 80 notifies the user that the target container has retreated to the retreat portion 60 and instructs the user (Step S435) to take action. Specifically, the control device 80 causes the display device 75 to display a screen indicating that the target container has retreated to the retreat portion. This allows the user to know that the target container has retreated to the retreat portion. Further, the control device 80 instructs the user to set the state of the original sample tray 30 so that the target container can be returned to the original sample tray 30. More specifically, in a case where the original sample tray 30 has not been set to the rack 31, the control device 80 causes the display device 75 to display a screen indicating that the original sample tray 30 should be set to the rack 31. Further, in a case where the original sample tray 30 has been set to the rack 31, but another sample container is set at the original position, the control device 80 causes the display device 75 to display a screen indicating that another sample container placed at the original position should be removed. This allows the user to know the action to take.

Then, the control device 80 determines whether the user has entered an input indicating that the action has been completed (Step S440). The input indicating that the action has been completed is made by the user using the input device 70. As one example, the control device 80 causes the display device 75 to display a "Action Completed" button and determines that an input indicating that an action has been completed when the button is operated. In a case where an input indicating that the action has been completed has been made by the user (YES in Step S440), the control device 80 causes the processing to shift to Step S445 and determines whether the target container can be returned from the retreat portion 60 to the original sample tray 30.

In Step S445, the control device 80 determines whether the original sample tray 30 has been set to the rack 31. The method of determining whether the original sample tray 30 has been set to the rack 31 is the same as that of Step S415.

In a case where the original sample tray 30 has been set to the rack 31 (YES in Step S445), the control device 80 causes the processing to proceed to Step S450. On the other hand, in a case where the original sample tray 30 has not been set to the rack 31 (NO in Step S445), the control device 80 determines that the target container cannot be returned from the retreat portion 60 to the original sample tray 30 and causes the processing to proceed to Step S460.

In Step S450, the control device 80 determines whether another sample container is placed at the original position. The method of determining whether another sample container has been placed at the original position is the same as that of Step S420. In a case where another sample container has been placed at the original position (YES in Step S450), the control device 80 determines that the target container cannot be returned from the retreat portion 60 to the original sample tray 30 and causes the processing to proceed to Step S460. On the other hand, in a case where another sample container has not been placed at the original position (NO in Step S450), the control device 80 causes the processing to shift to Step S455.

In Step S455, the control device 80 causes the target container to return from the retreat portion 60 to the original position of the original sample tray 30 and terminates the series of processing shown in FIG. 4 and FIG. 5.

In Step S460, the control device 80 notifies the user that the target container has retreated to the retreat portion 60 and instructs the user to take action. The method of the notification and that of the instruction are the same as those of Step S435.

Then, the control device 80 determines whether there is a user's input indicating that the action has been completed (Step S465). The method of determining whether there has been an input indicating that the response has been completed is the same as that of Step S440. In a case where there is an input indicating that the processing has been completed (YES in Step S465), the control device 80 returns the processing to Step S445. With this configuration, it is determined again whether the target container can be returned from the retreat portion 60 to the original sample tray 30. In a case where the target container can be returned from the retreat portion 60 to the original sample tray 30 (YES in Step S445 and NO in Step S450), the control device 80 returns the target container from the retreat portion 60 to the original position of the original sample tray 30 (Step S455). On the other hand, in a case where the target container cannot be returned from the retreat portion 60 to the original sample tray 30 (NO in Step S445 or YES in Step S450), the control device 80 notifies the user that the target container has retreated to the retreat portion 60 and instructs the user to take action (Step S460). It should be noted that the control device 80 may notify an error and interrupt the processing instead of the processing of Step A460 and Step A465. Further, when notifying an error, a message prompting a contact to a serviceman may be notified together.

As described above, the X-ray fluorescence analyzer 10 according to Embodiment 1 determines whether the sample container 40 can be returned to the original sample tray 30 when returning the sample container 40 to the original sample tray 30 after the measurement. There are two cases where the sample container 40 cannot be returned to the original sample tray 30. A first one is a case in which the original sample tray 30 on which the target container was originally placed has not been set to the rack 31. Another one is a case in which the original sample tray 30 has been set to the rack 31, but another sample container has been placed at the original position where the target container was originally placed. In such cases, if the sample container 40 is returned to the original sample tray 30, the sample container 40 may be damaged by falling or contacting another sample container. However, the X-ray fluorescence analyzer 10 according to Embodiment 1 causes the sample container 40 to retreat to the retreat portion 60 instead of returning it to the original position when the sample container 40 cannot be returned to the original sample tray 30. With this configuration, damages to the sample container 40 can be prevented, thereby eliminating the disadvantage of a device that sequentially measures a plurality of samples.

Further, when the sample container 40 has retreated to the retreat portion 60, the X-ray fluorescence analyzer 10 according to Embodiment 1 notifies the user that the sample container 40 has retreated to the retreat portion 60 and instructs the user to take action. This enables the user to know that the sample container 40 has retreated to the retreat portion and what the action should be taken.

Further, in a case where there is an input indicating that an action has been completed from the user, the X-ray fluorescence analyzer 10 according to Embodiment 1 determines whether the sample container 40 can be returned from the retreat portion 60 to the original sample tray 30. In a case where the sample container 40 can be returned to the original sample tray 30, the X-ray fluorescence analyzer 10 causes the sample container 40 to return from the retreat portion 60 to the original original position of the sample tray 30. On the other hand, in a case where the action of the user is not sufficient and therefore, the sample container 40 cannot be returned to the original sample tray 30, the X-ray fluorescence analyzer 10 notifies that the sample container 40 has retreated to the retreat portion 60 and instructs the user to take action. As a result, it is possible to prevent the sample container 40 from being damaged due to inadequate action of the user.

Further, the X-ray fluorescence analyzer 10 according to Embodiment 1 can determine whether another sample container has been placed at the original position by using the conveyance device 50. There is no need to separately provide a sensor or a device to determine whether another sample container has been placed at the original position, and therefore, the production cost of the X-ray fluorescence analyzer 10 can be reduced. For the purpose of preventing damage to the sample container 40, in a case where the sample container 40 cannot be returned to the original sample tray 30, a method can be conceived in which the sample container 40 is retained in the measurement device 20 until the sample container 40 can be returned to the original sample tray 30. In this method, the sample container 40 can be prevented from being damaged. On the other hand, in a case where the sample container 40 contains an acidic liquid sample, if the sample container 40 is retained in the measurement device 20, the inner side of the measurement device 20 will corrode due to the fact that the measurement device 20 is a closed and narrow space. In contrast, in the X-ray fluorescence analyzer 10 according to Embodiment 1, the sample container 40 is not placed inside the measurement device 20, but the sample container 40 is retreated to the unsealed retreat portion 60. As a result, it is possible to prevent the inside of the measurement device 20 from being corroded, which is capable of eliminating an adverse effect of a device that sequentially measures a plurality of samples. Further, since the retreat portion 60 is not sealed and is provided in a wide space in the X-ray fluorescence analyzer 10, even if the sample container 40 is retained at the retreat portion 60, the inside of the X-ray fluorescence analyzer 10 does not corrode.

In the above-described description, the X-ray fluorescence analyzer 10 determines, in Step S420 and Step S450, whether another sample container has been placed at the original position, based on the spread of the claws 52 caused by the operation of gripping the sample container 40 by the conveyance device 50, but the present invention is not limited thereto. As another example, the X-ray fluorescence analyzer 10 may determine whether another sample container has been placed at the conveyance device 50 based on whether the claws 52 contact the sample container 40 in accordance with the operation of gripping the sample container 40 at the original position. In the case of adopting such a determination method, the X-ray fluorescence analyzer 10 is provided at the front end of the claws 52 with a sensor for detecting the contact between the claws 52 and the sample container 40 by the sensor. The sensor is connected to the control device 80, and the detection result by the sensor is transmitted to the control device 80. In Step S420 and Step S450, the control device 80 causes the conveyance device 50 to perform the gripping of the sample container 40 at the original position, determines that another sample container has been placed at the original position when the contact between the claws 52 and the sample container 40 are detected, and determines that another original position has not been placed at the original position when the contact between the claws 52 and the sample container 40 is not detected at the original position.

Embodiment 2

In the X-ray fluorescence analyzer according to Embodiment 2, the determination method in Step S420 and Step S450 is different from that of the X-ray fluorescence analyzer 10 according to Embodiment 1. The X-ray fluorescence analyzer 10 according to Embodiment 1 determines whether another sample container has been placed at the original position, based on the state of the craws 52 associated with the operation of gripping the sample container 40 by the conveyance device 50. On the other hand, in the X-ray fluorescence analyzer according to Embodiment 2 does not require an operation of gripping the sample container 40 by the conveyance device 50 in determining whether another sample container has been placed at the original position. The X-ray fluorescence analyzer according to Embodiment 2 detects whether another sample container has been placed at the original position by a sensor. Hereinafter, the difference from the X-ray fluorescence analyzer 10 according to Embodiment 1 will be described. Note that the same component as that in Embodiment 1 is assigned by the same reference symbol, and the description thereof will not be repeated.

Figure 6:
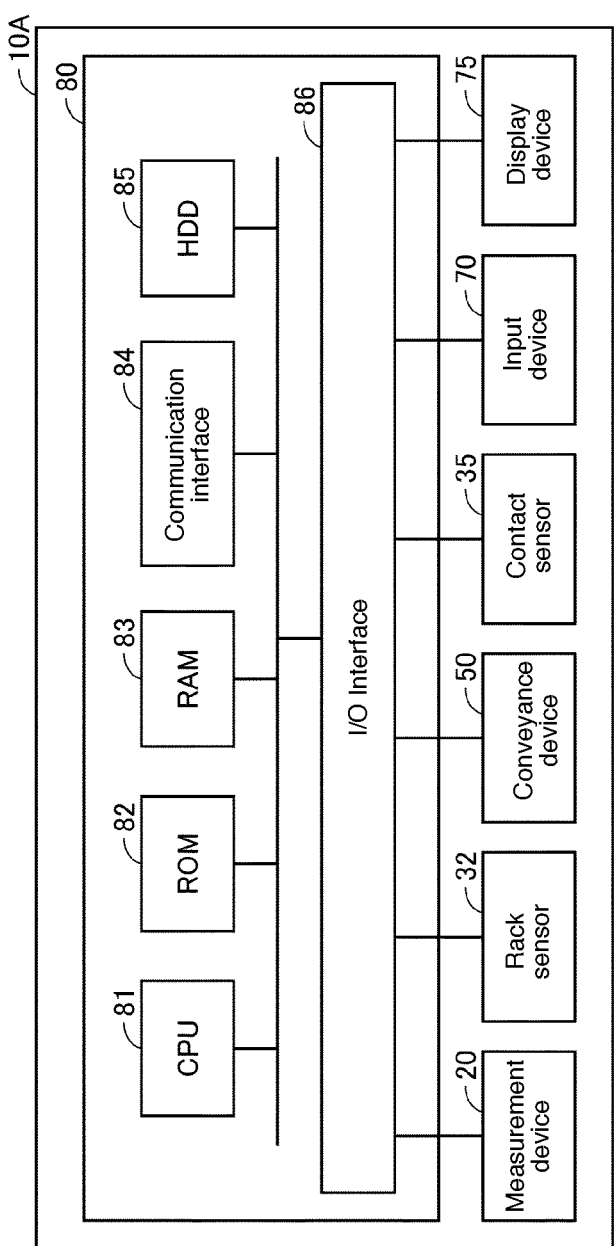
FIG. 6 is a diagram showing the control configuration of an X-ray fluorescence analyzer according to Embodiment 2.

FIG. 6 is a diagram showing the control configuration of an X-ray fluorescence analyzer 10A according to Embodiment 2. The X-ray fluorescence analyzer 10A is provided with, in addition to the configuration (see FIG. 1 and FIG. 2) equipped by X-ray fluorescence analyzer 10 according to Embodiment 1, a contact sensor 35 (corresponding to the "second sensor"). The contact sensor 35 detects the contact between the sample tray 30 (see FIG. 1) and the sample container 40 (see FIG. 1). The contact sensor 35 is one example of the sensor for detecting the presence or absence of the sample container 40 placed on the sample tray 30. The contact sensor 35 is provided at each position where the sample container 40 is placed on the sample tray 30. The contact sensor 35 transmits the detection result to the control device 80. The control device 80 determines whether another sample container has been placed at the original position, based on the detection result sent from the contact sensor 35. The control device 80 determines that another sample container has been placed at the original position when the contact between the sample ray 30 and the sample container 40 is detected at the original position, and determines that another sample container has not been placed at the original position when the contact between the sample tray 30 and the sample container 40 is not detected.

As described above, the X-ray fluorescence analyzer 10A according to Embodiment 2 is provided with the contact sensor 35, and therefore does not need to drive the conveyance device 50 to determine whether another sample container has been placed at the original position. Consequently, the driving frequency of the conveyance device 50 is suppressed, which can suppress the degradation of the conveyance device 50. Further, it is possible to shorten the time required for determining whether another sample container has been placed at the original position by the time required for gripping the sample container 40 by the conveyance device 50.

Note that the X-ray fluorescence analyzer 10A according to Embodiment 2 may detect whether another sample container is placed at the original position by the sensor without gripping the sample container 40 by the conveyance device 50. Therefore, instead of the contact sensor 35, a sensor for detecting the presence or absence of the sample container 40 by emitting light, a sensor for detecting the change in weight at each position where the

Modified Embodiments

In the above-described embodiments, the automated analyzer is an X-ray fluorescence analyzer, but the present invention is not limited thereto. It is sufficient that the automated analyzer according to the above-described embodiments is a device provided with a conveyance device for conveying the sample container to a location where a plurality of sample containers is to be placed (e.g., sample tray), a location where the measurement, the analysis, or the preparation is performed on a sample (e.g., a measurement device, an analyzer, a preparation device), and a location where one sample container is selected out of a plurality of sample containers placed to perform a measurement, an analysis, or a preparation, and returns the sample container to the original location after the measurement, the analysis, or the preparation, and may be, for example, an automated analyzer or a blood-coagulation analyzer having an autosampler (sample auto-preparation) function.

ASPECTS

It will be understood by those skilled in the art that the embodiments described are illustrative of the following aspects.

(Item 1)

An automated analyzer for analyzing a sample, comprising:

a measurement device configured to measure the sample;

at least one sample tray provided outside the measurement device, the at least one sample tray being configured to place a plurality of sample containers thereon;

a conveyance device configured to select one of the plurality of sample containers placed on the sample tray, convey the selected sample container to the measurement device, and return the sample container to an original sample tray on which the sample container was originally placed after measurement by the measurement device;

a control device configured to control an operation of the conveyance device; and a retreat portion provided at a position different from positions where the measurement device and the sample tray are provided, the retreat portion being configured to temporarily place the sample container.

The control device causes the sample container to retreat to the retreat portion n a case where the sample container is unable to be returned from the measurement device to the original sample tray.

According to the automated analyzer as recited in the above-described Item 1, in a case where the sample container cannot be returned from the measurement device to the original sample tray, the measured sample container retreats to the retreat portion. As a result, it is possible to prevent the sample container from being damaged due to falling or touching, and therefore, it is possible to eliminate an adverse effect of a device that sequentially measures a plurality of samples.

(Item 2)

The automated analyzer as recited in the above-described Item 1, further comprising:

a rack configured to set the sample tray; and a first sensor configured to detect that the sample tray is set to the rack.

The control device determines that the sample container is unable to be returned from the measurement device to the original sample tray in a case where the first sensor is unable to detect that the sample tray is set to the rack According to the automated analyzer described in the above-described Item 2, in a case where the sample tray has not been set to the rack, the sample container after the measurement is retreated to the retreat portion. As a result, it is possible to prevent the sample container from being damaged due to falling, and therefore, it is possible to eliminate an adverse effect of the device that sequentially measures a plurality of samples.

(Item 3)

The automated analyzer as recited in the above-described Item 2, wherein the conveyance device is provided with a gripping portion for gripping the sample container, wherein the conveyance device conveys the sample container with the sample container gripped by the gripping portion.

The control device causes the conveyance device to perform an operation to grip the sample container at a position where the sample container after the measurement is returned in a case where the first sensor detects that the sample tray is set to the rack, determines whether another sample container is placed at a position where the sample container after the measurement is returned, based on a status of the gripping portion caused by the operation, and determines that the sample container is unable to be returned from the measurement device to the original sample tray in a case where another sample container is placed at the position where the sample container after the measurement is returned.

According to the automated analyzer as recited in the above-described Item 3, in a case where although the sample tray has been set to the rack, another sample container has been placed at the position where the sample container after the measurement is returned, the sample container after the measurement retreats to the retreat portion.

With this configuration, it is possible to prevent the sample container from being damaged by contact with another sample container, and therefore, it is possible to eliminate an adverse effect of a device that sequentially measures a plurality of samples. Further, it is possible to determine whether another sample container has been placed at a position where the sample container after the measurement is returned by gripping the sample container. As a result, there is no need to provide a separate sensor/device to determine whether another sample container has been placed at the position where the sample container after the measurement is returned, and therefore, the production cost of the automated analyzer can be reduced.

(Item 4)

The automated analyzer as recited in the above-described Item 2, further comprising:

a second sensor configured to detect whether the sample container is placed on the sample tray.

The control device determines whether another sample container is placed at the position where the sample container after the measurement is returned, based on a detection result of the second sensor in a case where the first sensor detects that the sample tray is set to the rack, and determines that the sample container is unable to be returned from the measurement device to the original sample tray in a case where another sample container is placed at the position where the sample container after the measurement is returned.

According to the automated analyzer as recited in the above-described Item 4, in a case where the sample tray has been set to the rack, but another sample container has not been placed at a position where the sample container after the measurement is returned, the sample container after the measurement retreats to the retreat portion. With this configuration, it is possible to prevent the sample container from being damaged by contacting another sample container, and therefore, it is possible to eliminate an adverse effect of a device that sequentially measures a plurality of samples. Further, it is possible to determine whether another sample container has been placed at the position where the sample container after the measurement returns by the sensor without performing an operation of gripping the sample container. With this configuration, the frequency of driving the conveyance device is suppressed, so that deterioration of the conveyance device can be suppressed. Further, it is possible to reduce the time required to determine whether another sample container has been placed at the position where the sample container returns by the time required for the conveyance device to grasp the sample container.

(Item 5)

The automated analyzer as recited in any one of the above-described Items 1 to the above-described Item 4, further comprising:

a notification unit configured to notify that the sample container has retreated to the retreat portion in a case where the sample container has retreated to the retreat portion.

The control device determines whether the sample container is able to be returned from the retreat portion to the original sample tray after a notification by the notification unit, and returns the sample container to the original sample tray in a case where the sample container is able to be returned to the original sample tray.

According to the automated analyzer as recited in the above-described Item 5, the user is notified that the sample container has retreated to the retreat portion. This allows the user to know that the sample container has retreated to the retreat portion. Further, in the case of returning the sample container from the retreat portion to the original sample tray, it is determined whether the sample container can be returned to the original sample tray. In a case where the sample container can be returned to the original sample tray, the sample container is returned to the original sample tray. This prevents the sample container from being damaged due to inadequate action by the user.

(Item 6)

The automated analyzer as recited in any one of the above-described Items 1 to 5, wherein the measurement device is covered with a housing and an opening/closing lid to form a sealed space therein.

According to the automated analyzer as recited in the above-described Item 6, in a case where the sample container cannot be returned to the original sample tray, the sample container is not retained inside the measurement device but is retreated to the unsealed retreat portion. Thus, even in a case where the sample container contains an acid-liquid sample, the inside of the measurement device 20 can be prevented from being corroded.

(Item 7)

The automated analyzer as recited in any one of the above-described Items 1 to 6, wherein the automated analyzer is a fluorescence X-ray analyzer configured to analyze the sample by irradiating a surface of the sample with X-rays and detecting fluorescence X-rays generated from the surface.

According to the automated analyzer as recited in the above-described Item 7, in the X-ray fluorescence analyzer, since it is possible to prevent the sample container from being damaged by falling or touching, it is possible to eliminate the adverse effect of the device for sequentially measuring a plurality of samples.

The embodiments disclosed herein are to be considered in all respects as illustrative and not restrictive. The scope of the present invention is indicated by claims rather than by the foregoing descriptions, and is intended to include all modifications within the meanings and scope equivalent to the claims.

DESCRIPTION OF REFERENCE SYMBOLS

10A: X-ray fluorescence analyzer
20: Measurement device
22, 108: Opening
24: Opening/closing lid
30: Sample tray
31: Rack
32: Rack sensor
35: Contact sensor
40: Sample container
50: Conveyance device
51: Arm
52: Craw
53: Tip end portion
60: Retreat portion
70: Input device
75: Display device
80: Control device
81: CPU
82: ROM
83: RAM
84: Communication interface
85: HDD
86: I/O interface

102, 112: Housing
104: Sample stage
106: Sample chamber
110: Connecting passage
114: Measurement chamber
116: X-ray tube
118: Shutter
120: Primary X-ray filter
122: Collimator
124: Drive mechanism
126: Detector
128: Vent
130: Exhaust device
132: Air charging device
134: Switching valve

The invention claimed is:

1. An automated analyzer for analyzing a sample, comprising:

a measurement device configured to measure the sample;

at least one sample tray provided outside the measurement device, the at least one sample tray being configured to receive a plurality of sample containers thereon;

a conveyance device configured to select one of the plurality of sample containers placed on the sample tray, convey the selected sample container to the measurement device, and after measurement by the measurement device, return the sample container to an original sample tray on which the sample container was originally placed;

a control device configured to control an operation of the conveyance device; and a retreat portion provided at a position different from positions where the measurement device and the sample tray are provided, the retreat portion being configured to temporarily receive the sample container, wherein the control device causes the conveyance device to place the sample container at the retreat portion when the sample container is unable to be returned from the measurement device to the original sample tray, and wherein the automated analyzer is a fluorescence X-ray analyzer configured to analyze the sample by irradiating a surface of the sample with X-rays and detecting fluorescence X-rays generated from the surface.

2. The automated analyzer as recited in claim 1, further comprising:

a rack configured to set the sample tray; and a first sensor configured to detect that the sample tray is set to the rack, wherein the control device determines that the sample container is unable to be returned from the measurement device to the original sample tray when the first sensor is unable to detect that the sample tray is set to the rack.

3. The automated analyzer as recited in claim 2, wherein the conveyance device is provided with a gripping portion for gripping the sample container, wherein the conveyance device conveys the sample container with the sample container gripped by the gripping portion, and wherein the control device causes the conveyance device to perform an operation to grip a different sample container at a position where the sample container after the measurement is to be returned after the first sensor detects that the sample tray is set to the rack, determines whether the different sample container is placed at the position where the sample container after the measurement is to be returned, based on a status of the gripping portion, and determines that the sample container is unable to be returned from the measurement device to the original sample tray when the different sample container is placed at the position where the sample container after the measurement is to be returned.

4. The automated analyzer as recited in claim 3, wherein the status of the gripping portion is based on:

if the gripping portion is spread outwardly, then the control device determines that the different sample container is at the position where the sample container is to be returned; and if the gripping portion is not spread outwardly, then the control device determines that the position where the sample container is to be returned is not occupied.

5. The automated analyzer as recited in claim 4, wherein when the gripping portion is spread outwardly and the control device determines that the different sample container is at the position where the sample container is to be returned, the gripping portion is gripping the different sample container such that the different sample container causes the gripping portion to spread outwardly.

6. The automated analyzer as recited in claim 2, further comprising:

a second sensor configured to detect whether the sample container is placed on the sample tray, wherein the control device determines whether a different sample container is placed at the position where the sample container after the measurement is to be returned, based on a detection result of the second sensor when the first sensor detects that the sample tray is set to the rack, and determines that the sample container is unable to be returned from the measurement device to the original sample tray when the different sample container is placed at the position where the sample container after the measurement is to be returned.

7. The automated analyzer as recited in claim 2, wherein the rack supports a plurality of sample trays.

8. The automated analyzer as recited in claim 1, further comprising:

a notification unit configured to notify that the sample container has retreated to the retreat portion when the sample container has retreated to the retreat portion, wherein the control device determines whether the sample container is able to be returned from the retreat portion to the original sample tray after a notification by the notification unit, and returns the sample container to the original sample tray when the sample container is able to be returned to the original sample tray.

9. The automated analyzer as recited in claim 1, wherein the measurement device is covered with a housing and an opening/closing lid to form a sealed space therein.

10. An automated analyzer for analyzing a sample, comprising:

a measurement device configured to measure the sample;

at least one sample tray provided outside the measurement device, the at least one sample tray being configured to receive a plurality of sample containers thereon;

a rack configured to set the sample tray, wherein when the sample tray is set on the rack, the sample tray remains at a fixed position on the rack relative to the measurement device;

a conveyance device configured to select one of the plurality of sample containers placed on the sample tray, convey the selected sample container to the measurement device, and after measurement by the measurement device, return the sample container to an original sample tray on which the sample container was originally placed;

a control device configured to control an operation of the conveyance device; and a retreat portion provided at a position different from positions where the measurement device and the sample tray are provided, the retreat portion being configured to temporarily receive the sample container, wherein the control device causes the conveyance device to place the sample container at the retreat portion when the sample container is unable to be returned from the measurement device to the original sample tray, and wherein the automated analyzer is a fluorescence X-ray analyzer configured to analyze the sample by irradiating a surface of the sample with X-rays and detecting fluorescence X-rays generated from the surface.

11. The automated analyzer as recited in claim 10, wherein the sample tray remains at the same fixed position on the rack relative to the measurement device prior to removal of the sample container from the sample tray and during the measurement of the sample by the measurement device.

12. The automated analyzer as recited in claim 10, wherein the rack supports a plurality of sample trays.

13. The automated analyzer as recited in claim 10, further comprising a first sensor configured to detect that the sample tray is set to the rack and configured to detect an identifier of the sample tray.

14. The automated analyzer as recited in claim 10, wherein the sample container is at an original position on the original sample tray when the conveyance device selects the sample container and conveys the sample container to the measurement device, and wherein, after measurement by the measurement device, the control device causes the conveyance device to place the sample container at either the original position on the original sample tray or the retreat portion.

* * * * *